(12) United States Patent
Hoffmann

(10) Patent No.: US 10,826,420 B2
(45) Date of Patent: Nov. 3, 2020

(54) VOLTAGE GENERATING DEVICE AND METHOD FOR OPERATING A VOLTAGE GENERATING DEVICE

(71) Applicant: SIEMENS MOBILITY GMBH, Munich (DE)

(72) Inventor: Wolfgang Hoffmann, Erlangen (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 16/483,174

(22) PCT Filed: Dec. 20, 2017

(86) PCT No.: PCT/EP2017/083742
§ 371 (c)(1),
(2) Date: Aug. 2, 2019

(87) PCT Pub. No.: WO2018/141460
PCT Pub. Date: Aug. 9, 2018

(65) Prior Publication Data
US 2020/0235686 A1 Jul. 23, 2020

(30) Foreign Application Priority Data

Feb. 2, 2017  (DE) .................. 10 2017 201 690

(51) Int. Cl.
*H02P 9/30* (2006.01)
(52) U.S. Cl.
CPC .................... *H02P 9/305* (2013.01)
(58) Field of Classification Search
CPC ....................................... H02P 9/305
See application file for complete search history.

(56) References Cited

U.S. PATENT DOCUMENTS

| 5,872,710 A | 2/1999 | Kameyama |
| 8,847,558 B2 | 9/2014 | Schmidt |

(Continued)

FOREIGN PATENT DOCUMENTS

| DE | 19808104 A1 | 9/1999 |
| DE | 102004025241 A1 | 12/2005 |

(Continued)

OTHER PUBLICATIONS

Chiniforoohs S. et al.: "Dynamic modelling and characterisation of vehicular power system considering alternator iron core and rectifier losses", IET Electrical Systems in Transportation, 2012, vol. 2, Issue 2, pp. 58-67, ISSN: 2042-9738, DOI: 10.1049/iet-est.2011.0031.

(Continued)

*Primary Examiner* — Viet P Nguyen
(74) *Attorney, Agent, or Firm* — Laurence Greenberg; Werner Stemer; Ralph Locher

(57) ABSTRACT

A voltage generating device includes a mechanically driven generator that is separately excited. An electric starting voltage of the generator is rectified by way of a rectifier. The voltage generating device is closed-loop-controlled by way of a regulating device. A current regulating device has a model of an excitation coil of the generator, and a model value of the electric excitation current of the generator can be ascertained using the model. The current regulating device additionally has a correction element, by way of which the model value of the electric excitation current can be corrected such that the model value of the electric excitation current better matches the actual value of the electric excitation current in a defined manner.

6 Claims, 6 Drawing Sheets

(56) References Cited

U.S. PATENT DOCUMENTS

| | | | |
|---|---|---|---|
| 9,300,236 B2 | 3/2016 | Kadric et al. | |
| 9,337,761 B1 | 5/2016 | Seidl | |
| 2002/0053889 A1* | 5/2002 | Gold | H02K 19/36 318/154 |
| 2005/0001582 A1* | 1/2005 | Goto | F02N 11/0859 318/802 |
| 2008/0296898 A1 | 12/2008 | Ichinose et al. | |
| 2010/0201330 A1* | 8/2010 | Ichinose | H02P 9/105 322/61 |
| 2011/0101929 A1* | 5/2011 | Maedako | H02P 9/305 322/24 |
| 2013/0207589 A1* | 8/2013 | Margner | H02P 29/032 318/717 |
| 2015/0280629 A1* | 10/2015 | Diedrichs | H02J 3/24 290/44 |
| 2017/0063265 A1* | 3/2017 | De Lamarre | H02P 9/305 |

FOREIGN PATENT DOCUMENTS

| | | |
|---|---|---|
| DE | 102010040863 A1 | 3/2012 |
| DE | 102011088314 A1 | 6/2013 |
| DE | 102015118949 A1 | 5/2016 |
| DE | 102015100010 A1 | 6/2016 |

OTHER PUBLICATIONS

Stoia, Dan et al.: "An Electromagnetic Model for the Lundell Alternator With Switched-Mode Rectifier", IEEE 2008, 25th Convention of Electrical and Electronics Engineers in Israel, pp. 815-819, http://ieeexplore.ieee.org/stamp/stamp.jsp?tp=&arnumber=4736651&isnumber=41736539.

* cited by examiner

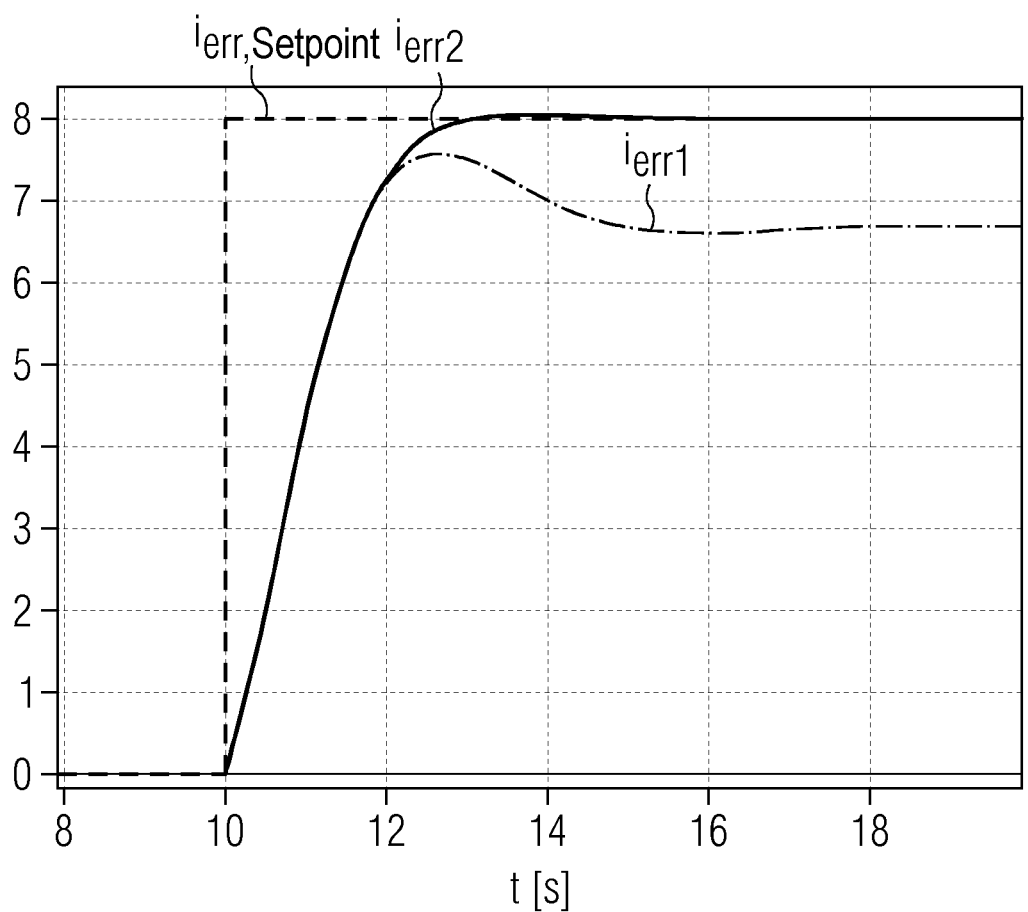

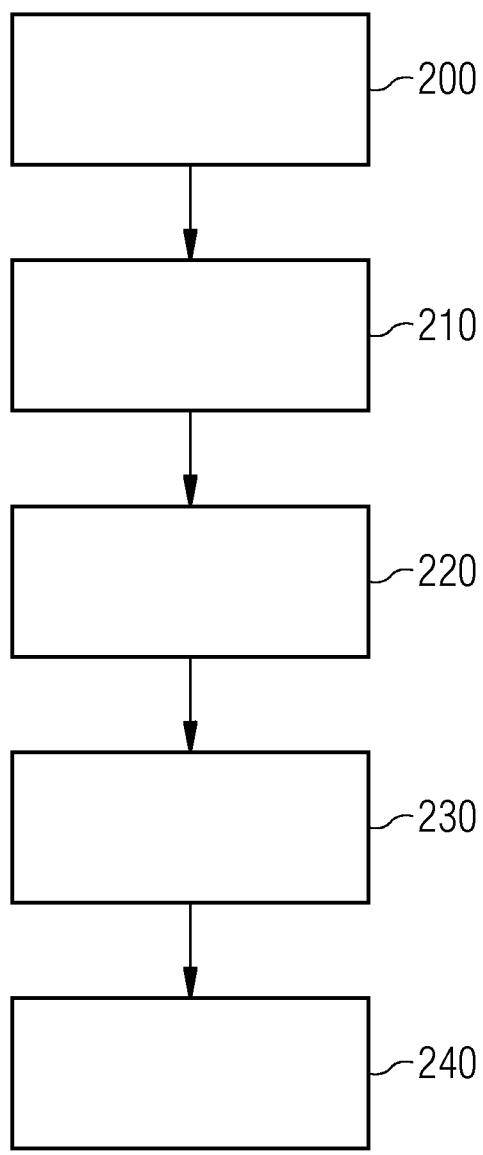

VOLTAGE GENERATING DEVICE AND METHOD FOR OPERATING A VOLTAGE GENERATING DEVICE

BACKGROUND OF THE INVENTION

Field of the Invention

The invention relates to a voltage generating apparatus and a method for operating such an apparatus.

Regulable voltage generating apparatuses for generating a voltage for consumers are known. Here, use is made of voltage regulators and current regulators, with load variations being taken account of by means of a characteristic, parameters for the characteristic only being obtainable with very much outlay, for example from data sheets of a driving generator.

SUMMARY OF THE INVENTION

It is an object of the present invention to provide an improved voltage generating apparatus.

According to first aspect, the object is achieved by a voltage generating apparatus, comprising:
  a mechanically drivable, separately excited generator device;
  wherein an output voltage of the generator device is rectifiable by means of a rectifier device;
  wherein the voltage generating apparatus is regulable by means of a regulating apparatus;
  wherein the current regulating device comprises a model of an exciter winding of the generator device, a model value of the electric excitation current of the generator device being ascertainable by means of the model;
  wherein the current regulating device further comprises a correction element, the latter rendering the model value of the electric excitation current correctable in such a way that the model value of the electric excitation current better matches the actual value of the electric excitation current in a defined manner.

This allows the voltage generating apparatus according to the invention to use dead time-afflicted measured signals. An improved control response of the voltage generating apparatus is realized as a result on account of the corrected model value of the electric excitation current. In particular, this can achieve an improved dynamic response of the regulation of the voltage generating apparatus.

According to a second aspect, the object is achieved by a method for operating a voltage generating apparatus comprising a mechanically driven, separately excited generator device and a rectifier device interconnected with the generator device, said method including the steps of:
  generating a rectified output voltage of the generator device;
  capturing, using measurement technology, a measured value of the electric excitation current for the generator device;
  creating a model value of the electric excitation current;
  correcting the model value by means of a correction element of a current regulating device in such a way that the model value of the electric excitation current better matches the measured value of the electric excitation current in a defined manner; and
  generating an excitation voltage for an exciter device of the generator device from the corrected model value and a setpoint value of the electric excitation current.

An advantageous development of the voltage generating apparatus is distinguished in that the correction element renders the model value of the electric excitation current correctable with the aid of the dead time-afflicted measured value of the electric excitation current. This forms a type of mixed product of a current model value and the measured electric excitation current, with an improved model value of the electric excitation current being obtained as a result thereof.

A further advantageous development of the voltage generating apparatus is characterized in that a current measured value of the electric excitation current and a delayed value of the model are compared to one another, the difference being used as a correction value for improving the model value. In this way, the preceding model error is used for correcting the current model value of the electric excitation current, which better corresponds to the real conditions.

A further advantageous development of the voltage generating apparatus is distinguished in that the correction element further comprises a smoothing member for the correction value of the model value of the electric excitation current. In this way, an optional smoothing member can be used to smooth the correction value using the smoothing member should the measured value be very noisy.

A further advantageous development of the voltage generating apparatus is distinguished in that the dead time member of the correction element has substantially the same dead time as the dead time between the actual value of the electric excitation current and the measured value of the electric excitation current. In this way, a dead time affliction of the measured electric excitation current can be taken into account for the model in a simple manner.

A further advantageous development of the voltage generating apparatus is characterized in that the corrected value of the electric excitation current and a setpoint value of the electric excitation current are supplied to a regulating element. In this way, an improved excitation voltage is provided for an improved dynamic response of the regulable voltage generating apparatus.

What is considered particularly advantageous in the case of the invention is that simple technical means render it possible to compensate load variations of the voltage generating apparatus more dynamically. Advantageously, no complicated additional devices have to be used to this end; instead, a provision of a corrected model value of the electric excitation current suffices for ascertaining the electric excitation current.

The above-described properties, features and advantages of the invention and the manner in which these are achieved, will become clearer and more easily understandable in conjunction with the following description of the exemplary embodiments, which are explained in more detail in conjunction with the figures.

BRIEF DESCRIPTION OF THE SEVERAL VIEWS OF THE DRAWING

FIG. 8 shows profiles of the electric excitation current ascertained using simulation technology; and FIG. 9 shows the basic procedure of an embodiment of the method according to the invention.

DESCRIPTION OF THE INVENTION

Figure 1:
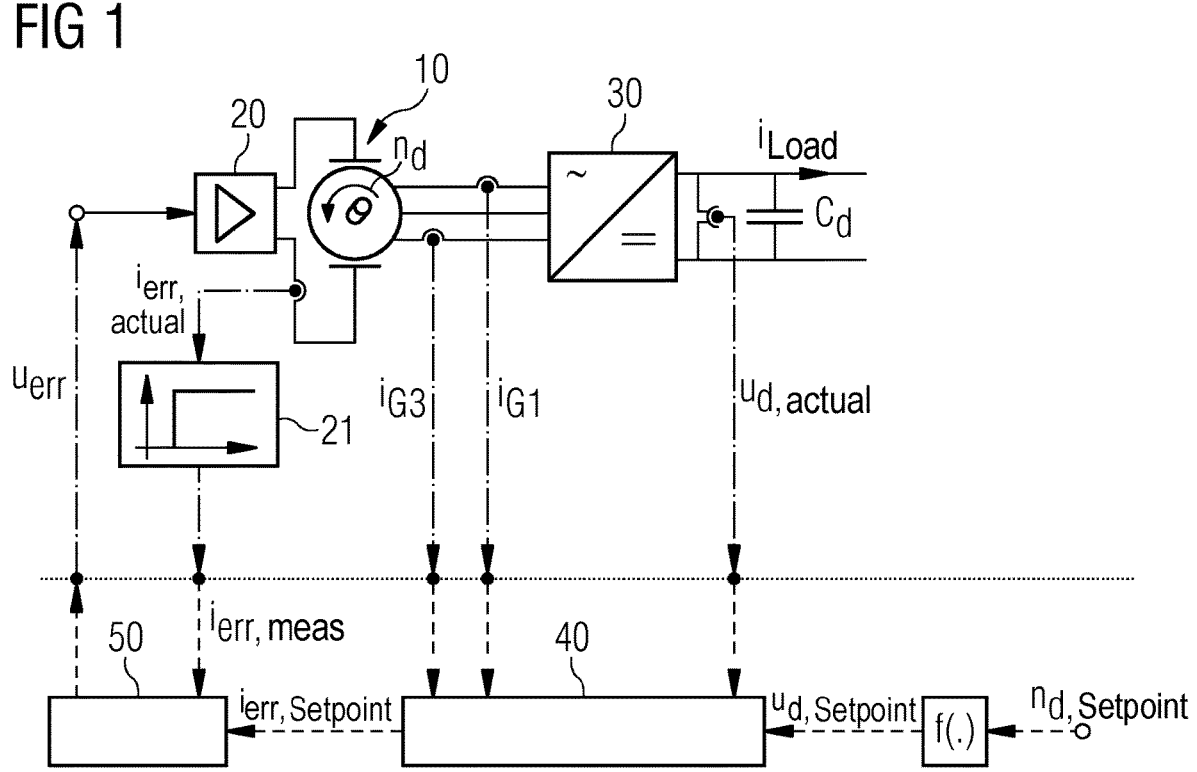
FIG. 1 shows a block diagram of a voltage generating apparatus in basic representation.

FIG. 1 shows a basic block diagram of an embodiment of a regulable voltage generating apparatus 100. It is possible to identify a separately excited generator device 10 (e.g., in the form of a separately excited synchrotron generator), which is electrically excited by means of an exciter appliance or an exciter device 20. A three-phase output voltage of the generator device 10 is supplied to a rectifier device 30, which is preferably in the form of a B6 bridge circuit. A rectified output voltage $u_d$ (DC link voltage) is available at the output of the rectifier device 30 at a DC link capacitor $C_d$, a load (not illustrated), for example in the form of an electrical traction motor of a locomotive, being connectable to said output voltage.

A rotational speed $n_d$ of the separately excited generator device 10 is controlled in this case by a control device (e.g., by a diesel unit; not illustrated) of the generator device 10, with, for example, a diesel injection amount of the diesel unit being metered accordingly for the purposes of setting a defined rotational speed $n_d$.

A regulating apparatus 40, 50 is identifiable in the lower region of FIG. 1, measured signals of the controlled system in the form of the exciter device 20, the generator device 10 and the rectifier device 30 being transmitted to said regulation apparatus by way of a bus indicated using dashed lines. An excitation voltage $u_{err}$ is provided for the exciter device 20 of the generator device 10 by means of the regulating apparatus 40, 50, said excitation voltage being used to regulate the DC link voltage $u_d$ to a setpoint value $u_{soll}$, with the setpoint value of the DC link voltage $u_d$ being a function of the generator rotational speed $n_d$. It is possible to identify a voltage regulating device 40, which is functionally interconnected with a current regulating device 50. Electric phase currents $i_{G1}$, $i_{G3}$ of the generator device 10 and, furthermore, a measured value of the DC link voltage $u_{d,ist}$ are supplied to the voltage regulating device 40. Furthermore, a setpoint value of the DC link voltage $u_{d,soll}$ is supplied to the voltage regulating device 40, said setpoint value of the DC link voltage being formed from a defined function f(.) from a setpoint rotational speed value $n_{d,soll}$ of the generator device 10.

A setpoint value of the electric excitation current $i_{err,soll}$, which is supplied to a current regulating device 50, is ascertained by means of the voltage regulating device 40. Furthermore, a measured value of the electric excitation current $i_{err,mess}$ is supplied to the current regulating device 50, said measured value being derived from a measured actual value of the electric excitation current $i_{err,ist}$.

From the supplied variables, the current regulating device 50 ascertains an electric actuation signal in the form of the excitation voltage $u_{err}$ for the exciter device 20. It is possible to identify a dead time member 21 that is disposed between the measured actual value of the electric excitation current $i_{err,ist}$ and the measured value of the electric excitation current $i_{err,mess}$ said dead time member intending to elucidate a dead time affliction or time delay of the measured value of the electric excitation current $i_{err,mess}$ at the current regulating device 50. In particular, the dead times are generated by propagation delay times of the measured electrical variables within the scope of the transmission to the current regulating device 50. As a result, the current regulating device 50 loses a phase margin here, with the specified phase margin no longer being sufficient to regulate the DC link voltage $u_{d,ist}$ with a sufficient dynamic response in conjunction with the voltage regulating device 40.

In the prior art, the underlying current regulation only supplies good results in relation to the dynamic response of the generator regulation if the model is sufficiently accurate. On account of temperature dependences and manufacturing tolerances, a preset model during the service life will never be accurate enough over an entire fleet of locomotives driven by means of the voltage generating apparatus 100.

Therefore, the conventional voltage regulation will not be sufficiently dynamic in many locomotives, wherein, however, unwanted protection mechanisms, such as torque restrictions, for example, may become active in certain operational cases.

Figure 2:
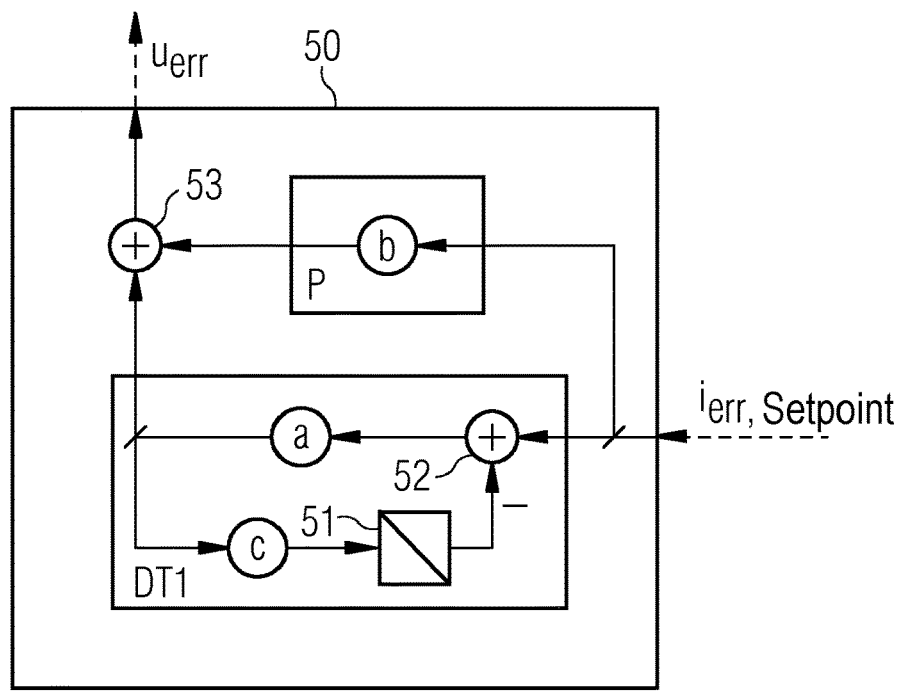
FIG. 2 shows a basic block diagram of a conventional current regulating device.

FIG. 2 shows a current regulating device 50 according to the prior art, wherein the current regulating device 50 is embodied as a PDT1 member. Conventionally, the dead time-afflicted measured value of the electric excitation current $i_{err,mess}$ is not used by the current regulating device 50, which is why the aforementioned dead time affliction does not constitute a problem. It is possible to identify that the setpoint value of the electric excitation current $i_{err,soll}$ coming from the voltage regulating device 40 (not illustrated) is supplied to a DT1 member (derivative member with time delay, "real differentiator").

Here, the parameters a, c of the DT1 member represent installation-specific coefficients that realize the best possible control response. The DT1 member comprises a first summing unit 52, which is supplied with the setpoint value of the electric excitation current $i_{err,soll}$. The elements a and c of the DT1 member represent installation-specific parameters, which support a good control response of the overall system. It is possible to identify an integrating member 51 interconnected between the parameter c and the summing unit 52. An output signal of the DT1 member is supplied to a second summing unit 53, which is further supplied with an output signal of a proportional-action member P with an installation-specific parameter b. The setpoint value of the electric excitation current $i_{err,soll}$ is supplied to the proportional-action member P. The excitation voltage $u_{err}$ for the exciter device 20 is formed by means of the second summing unit 53.

Figure 3:
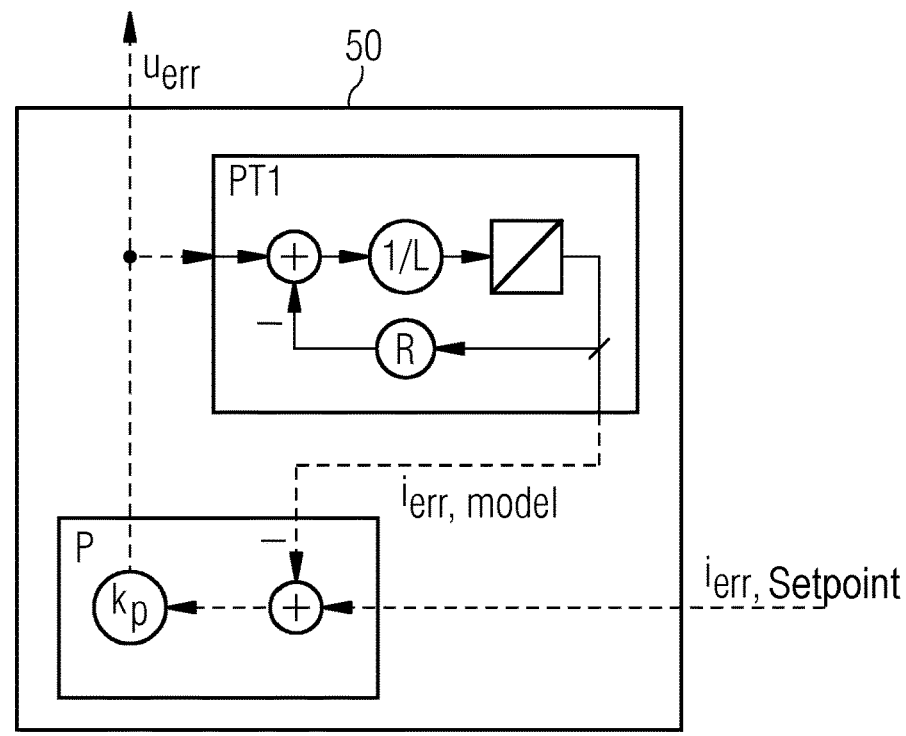
FIG. 3 shows the current regulating device of FIG. 2 in another representation.

FIG. 3 shows a current regulating device 50 of FIG. 2 in another representation. It is now possible to identify a PT1 member, which represents a model of the exciter winding of the generator device 10, with the parameters L and R representing an inductance and an ohmic resistance, respectively, of the exciter winding. The input signal of the PT1 member is the excitation voltage $u_{err}$ formed with the gain factor $k_p$ by the proportional-action member P, with an output signal of the PT1 member representing a model value of the electric excitation current $i_{err,modell}$. The system deviation between the model value of the electric excitation current $i_{err,modell}$ and the setpoint value of the electric excitation current $i_{err,soll}$ is supplied to the proportional-action member $k_p$, the output variable of which is the manipulated variable in the form of the excitation voltage $u_{err}$ for the exciter device 20.

Figure 4:
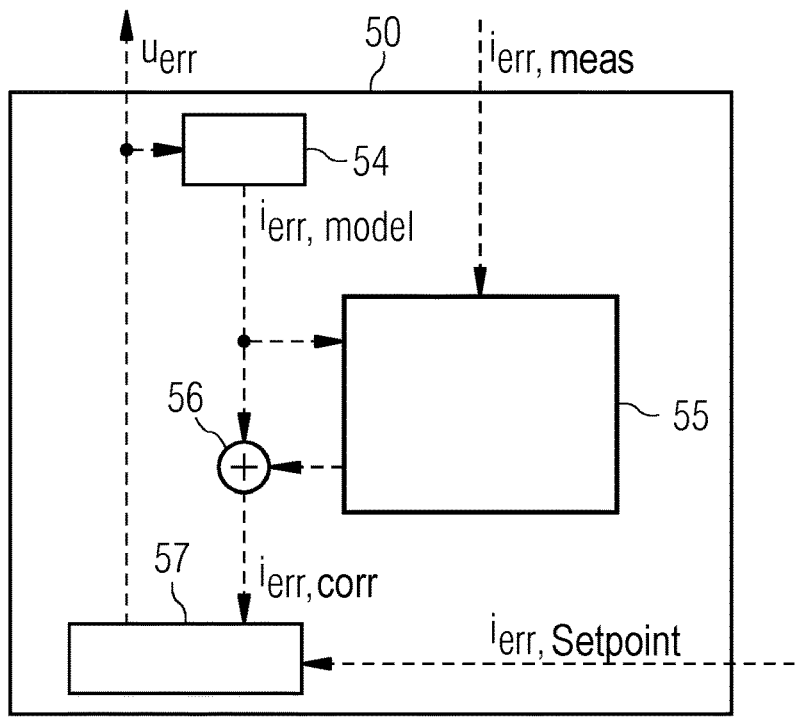
FIG. 4 shows a block diagram of a proposed current regulating device comprising a correcting device.

FIG. 4 shows an embodiment of the current regulating apparatus 50 according to the invention. Within the current regulating device 50, it is possible to identify a model 54, which represents a mathematical model of the exciter winding of the generator device 10 and which generates a map of the excitation voltage $u_{err}$ in the form of a model value of the electric excitation current $i_{err,modell}$. The modeled electric excitation current $i_{err,modell}$ is supplied to a correction element 55, which is furthermore supplied with a measured value of the dead time-afflicted electric excitation current $i_{err}$.

An output signal of the correction element 55 is supplied to a third summing unit 56, the third summing unit 56 forming a corrected model value of the electric excitation current $i_{err,korr}$, which matches the actual value of the electric excitation current $i_{err,mess}$ better than the model value of the electric excitation current $i_{err,modell}$ and which is supplied to a regulating element 57, for example in the form of a P-controller, I-controller, PI-controller, nonlinear controller, etc. Thus, it is possible to identify that the current regulating device 50 uses the dead time-afflicted excitation current measured value $i_{err,mess}$.

Figure 5:
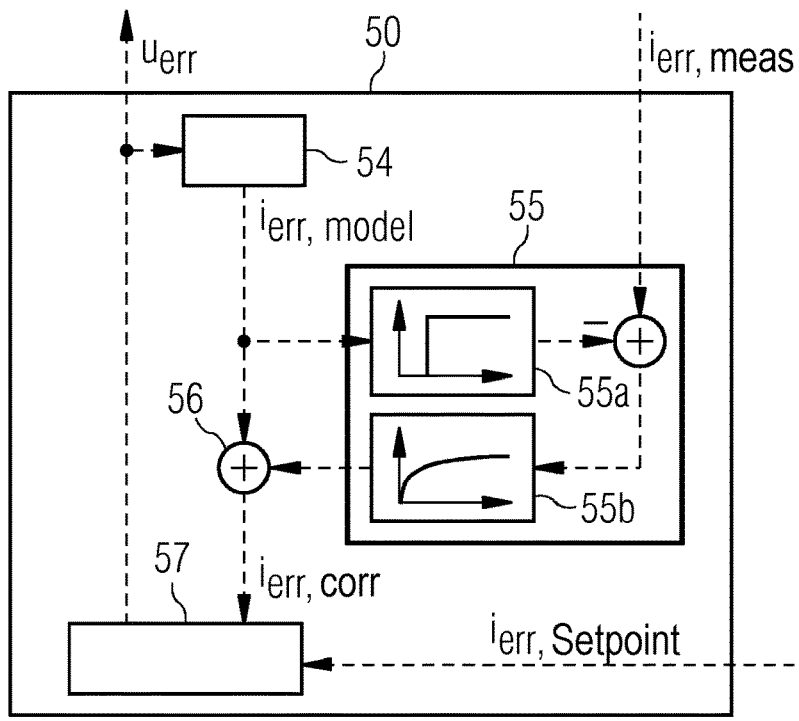
FIG. 5 shows the current regulating device of FIG. 4 with a higher degree of detail for the correcting device.

FIG. 5 shows the current regulating device 50 of FIG. 4 with the correction element 55 with a higher degree of detail. The correction element 55 contains the dead time member 55a with substantially the same dead time as the dead time between the actual value of the electric excitation current $i_{err,ist}$ and the measured value of the electric excitation current $i_{err,mess}$ and an optional smoothing member 55b in the form of a PT1 member. Thus, as a result, this uses an error that has been delayed by the dead time, i.e., an "older" error, of the model 54 for the purposes of generating a corrected model value of the electric excitation current.

In the case of a dead time of approximately 100 ms, the tolerance for the correspondence of the two aforementioned dead times is approximately ±2 ms, i.e., ±2% of the overall value. A time delay of the dead time member 55a, established in advance, is set once at the dead time member 55a (one-time parameterization). The duration of the dead time depends on components of the voltage generating apparatus 100, with the assumption being made that the aforementioned duration of the dead time does not change during the operation of the voltage generating apparatus 100.

The difference between the delayed model value of the electric excitation current $1_{err,modell}$ and the dead time-afflicted measured value of the electric excitation current $i_{err,mess}$ corresponds to the past error between the model value of the electric excitation current $i_{err,modell}$ and the actual value of the electric excitation current $i_{err,ist}$ before expiry of the dead time.

Thus, the actual value of the electric excitation current, as present prior to expiry of the dead time, is subtracted from the model value of the electric excitation current, as present prior to the expiry of the dead time.

As a result of this, the size of the difference or the error between the actual value and the model value of the electric excitation current prior to expiry of the dead time is known, the error being added as a correction term or correction value at the third summing unit 56 to the current model value of the electric excitation current $i_{err,modell}$ under the assumption that this error still currently exists approximately. In this way, a model value of the electric excitation current $i_{err,korr}$, corrected by an old error, is supplied to the regulating element 57, the latter forming the excitation voltage $u_{err}$ therefrom together with the setpoint value of the excitation current $i_{err,soll}$ supplied by the voltage regulating device 40.

The correction term of the correction element 55 can be smoothed by means of the optional smoothing member 55b. As a result, said a correction term is slightly phase delayed; however, this measure may be advantageous in individual cases should there be a pronounced noise component of the electric excitation current $i_{err,mess}$ captured by measurement technology.

Consequently, in relation to conventional methods, the invention makes use of the measured electric excitation current $i_{err,mess}$ in the current regulating device 50. As a result, the model value of the electric excitation current is mapped more precisely. The proposed procedure is similar to realization of Luenberger or Kalman feedback in observer structures.

Figure 6:
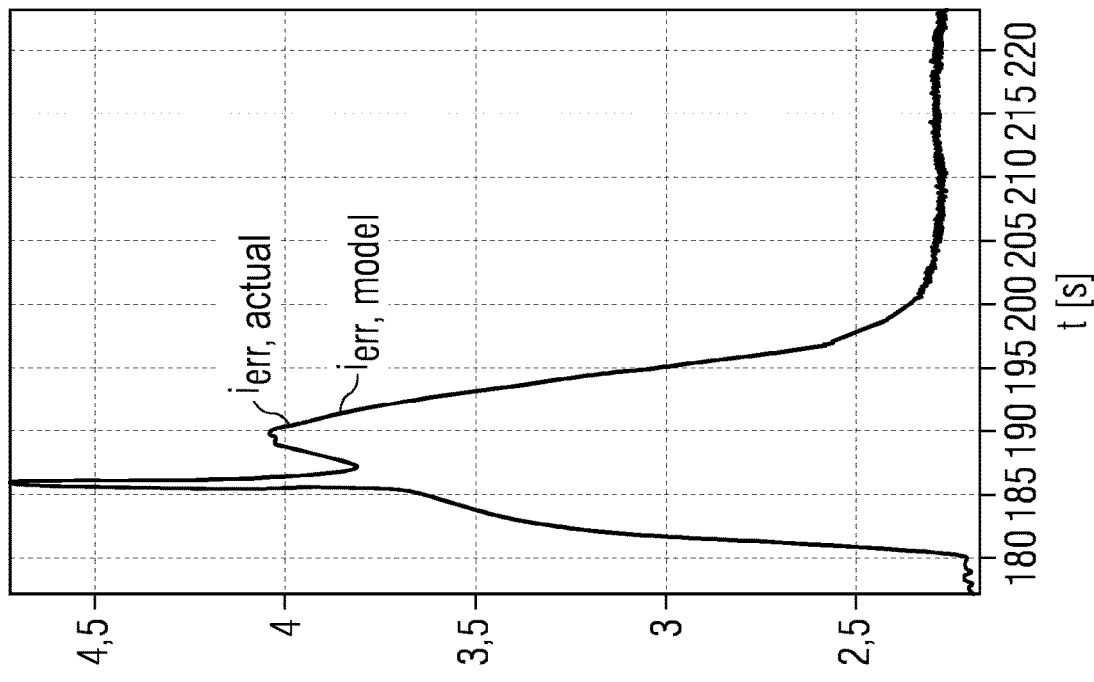
FIG. 6 shows time profiles of an electric excitation current and of a model value of the electric excitation current.
Figure 7:
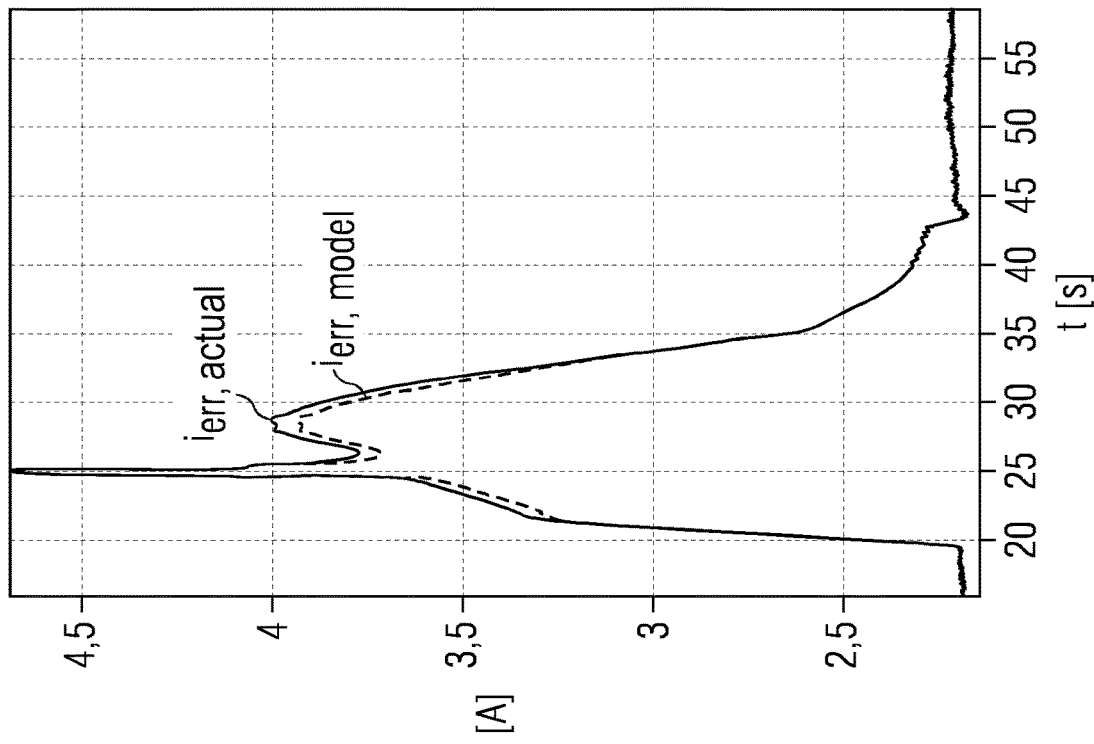
FIG. 7 shows time profiles of an electric excitation current and of a model value, corrected according to the invention, of the electric excitation current.

FIGS. 6 and 7 show measurements on a diesel-electric locomotive embodied as a load of the voltage generating apparatus 100, the invention being implemented in the control and protection system of said locomotive.

FIG. 6 shows a time profile of an actual value of the electric excitation current $i_{err,ist}$ and a time profile of a model value of the electric excitation current $i_{err,modell}$, with the correction according to the invention being deactivated.

FIG. 7 shows the time profiles of the actual value of the electric excitation current $i_{err,ist}$ and of the modeled excitation current $i_{err,modell}$ with a correction according to the invention. It is possible to identify that the two aforementioned profiles are largely corresponding in FIG. 7, as a result of which a control characteristic of the entire voltage generating apparatus 100 is significantly improved.

FIG. 8 shows three time profiles of electric excitation currents, ascertained by simulation technology, in a control loop with the exciter device 20, a rotor winding of the generator device 10 and the current regulating device 50, without other components of the voltage generating apparatus 100 being taken into account. This simulates the exciter winding system of the generator device 10, which is substantially represented by a PT1 member. Here, an effect of the proposed correction element 55 of the current regulating device 50 in the closed control loop should be elucidated.

It is possible to identify a discontinuous setpoint profile of the electric excitation current $i_{err,soll}$. The aforementioned controlled system is of first order with a dead time. The model parameters of inductance L and ohmic resistance R of the simulated PT1 model are detuned by approximately 20% with respect to the actual conditions of the controlled system, as a result of which a deviation of the model from the actual conditions should be expressed.

With the same rise time, the profile of the electric excitation current $i_{err1}$ significantly overshoots the setpoint value and stabilizes at an incorrect final value when the 20% deviation is taken into account but the correction element 55 is not used. The use of the correction element 55 supplies a time profile of the regulated actual value of the excitation current $i_{err2}$, which runs onto the correct final value and hardly has any overshoot in the process. In this way, the correction element 55 is able to compensate the 20% deviation of the model from the system. Measurements on a traction motor, embodied as a load of the voltage generating apparatus 100, of a locomotive confirm this behavior.

The proposed method can also be provided for corrective modeling of other applications without a control loop. Here, it is possible to consider processes in which process variables are not available fast enough, for example processes with monitoring of hard-to-measure measured variables, in particular measured variables with a dead time affliction where it is not acceptable to await a time-delayed transmission of the measured variable caused by the dead time affliction. In this way, it is possible, for example, to realize emergency off switches should a defined threshold of the measured variable be exceeded.

The invention supports a high dynamic response of the voltage regulation over all locomotives and the service life of a fleet of locomotives.

Advantageously, the method according to the invention can be implemented as software, which is executed on a microcomputer (not illustrated) of the regulating apparatus 40, 50. Such an implementation advantageously renders possible a simple modification or adaptation of the method according to the invention.

FIG. 9 shows a basic flow chart of an embodiment of the method according to the invention for operating a voltage generating apparatus 100 comprising a mechanically driven, separately excited generator device 10 and a rectifier device 30 interconnected with the generator device 10.

In a step 200, generating a rectified output voltage of the generator device 10 is carried out.

In a step 210, capturing, using measurement technology, a measured value of the electric excitation current for the generator device 10 is carried out.

In a step 220, creating a model value of the electric excitation current is carried out.

In a step 230, correcting the model value by means of a correction element 55 of a current regulating device 50 is carried out in such a way that the model value of the electric excitation current better matches the measured value of the electric excitation current in a defined manner.

In a step 240, generating an excitation voltage $u_{err}$ for an exciter device 20 of the generator device 10 from the corrected model value and a setpoint value of the electric excitation current is carried out.

In conclusion, the present invention achieves a correctively modeled realization of a regulable voltage source with a separately excited synchrotron generator and a rectifier bridge, which advantageously facilitates a highly dynamic compensation of different loads in a simple manner.

Even though the invention was illustrated and described more closely in detail by preferred exemplary embodiments, the invention is not restricted by the disclosed examples and other variations can be derived therefrom by a person skilled in the art without departing from the scope of protection of the invention.

The invention claimed is:

1. A voltage generating apparatus, comprising:
a mechanically drivable, separately excited generator;
a rectifier connected to said generator and configured to rectify an output voltage of said generator;
a regulating apparatus configured for closed-loop-control of the voltage generating apparatus;
said regulating apparatus including a current regulator having a model of an exciter winding of said generator, said model enabling a model value of an electric excitation current of said generator to be ascertained by way of said model;
said current regulator further including a correction element enabling a correction of the model value of the electric excitation current such that the model value of the electric excitation current better matches an actual value of the electric excitation current in a defined manner;
said correction element enabling a correction of the model value of the electric excitation current with the aid of a dead time-afflicted measured value of the electric excitation current, and wherein a current measured value of the electric excitation current and a delayed value of the model value of the electric excitation current are compared to one another, a difference being used as a correction value for improving the model; and
a closed-loop control element for generating an excitation voltage for the exciter device from the corrected value of the electric excitation current and a setpoint value of the electric excitation current.

2. The voltage generating apparatus according to claim 1, wherein said correction element further comprises a smoothing member for the correction value of the model value of the electric excitation current.

3. The voltage generating apparatus according to claim 2, wherein a dead time member of said correction element has substantially the same dead time as the dead time between the actual value of the electric excitation current and the measured value of the electric excitation current.

4. A method for operating a voltage generating apparatus which has a mechanically driven, separately excited generator and a rectifier device interconnected with the generator, the method comprising the following steps:
generating a rectified output voltage of the generator;
capturing, by measurement, a measured value of an electric excitation current for the generator;
creating a model value of the electric excitation current;
correcting the model value by way of a correction element of a current regulating device in such a way that the model value of the electric excitation current better matches the measured value of the electric excitation current in a defined manner, wherein the model value of the electric excitation current is corrected by the correction element with the aid of a dead time-afflicted measured value of the electric excitation current, wherein a current measured value of the electric excitation current and a delayed value of the model value of the electric excitation current are compared with one another, and wherein a difference is used as a correction value for improving the model value of the electric excitation current; and
generating an excitation voltage for an exciter device of the generator from the corrected model value and a setpoint value of the electric excitation current.

5. The method according to claim 4, which comprises using substantially the same dead time for a dead time member of the correction element as a dead time between the actual value of the electric excitation current and the measured value of the electric excitation current.

6. A non-transitory computer program product, comprising program code for carrying out the method according to claim 4 when said program code is executed in an electronic closed-loop-control apparatus or said program code is stored on a computer-readable data medium.

* * * * *